March 19, 1957  W. BENNETT  2,785,888
SPRING MOUNTING FOR VEHICLES
Filed July 3, 1953  2 Sheets-Sheet 1

WALTER BENNETT,
INVENTOR.

BY
Barkelew & Cauklebury
ATTORNEYS.

March 19, 1957 W. BENNETT 2,785,888
SPRING MOUNTING FOR VEHICLES
Filed July 3, 1953 2 Sheets-Sheet 2

WALTER BENNETT,
INVENTOR.

BY
Barkelew & Scantlebury
ATTORNEYS.

United States Patent Office 2,785,888
Patented Mar. 19, 1957

2,785,888

SPRING MOUNTING FOR VEHICLES

Walter Bennett, Los Angeles, Calif., assignor to Utility Trailer Manufacturing Company, Los Angeles, Calif., a corporation of California Application July 3, 1953, Serial No. 365,973

7 Claims. (Cl. 267—56)

This invention has to do with mountings for vehicle springs of the semi-elliptic type.

In semi-elliptic vehicle springs as is well known the load carrying action of the spring involves two movements of the spring ends relative to their mountings: movements longitudinal of the spring leaves and angular or rotative movements with respect to the mount. If one end of the spring is fixed as regards longitudinal movement, either directly by some fastening applied to the spring or by a radius rod, the longitudinal movement at the other, free end is doubled. And if, as in a multiple axle system, that other free end is mounted on and carried by a rotatable balance beam or rocker arm, the relative longitudinal movement is not only further increased but the relative angular movement is very much exaggerated because the spring and the beam rotate about widely separated centers.

The object and purpose of the present invention is to provide an improved mounting structure for the spring which will fully accommodate all its relative movements and have advantages in the way of giving the spring improved support. Primary advantages of the invention reside in its provision of a trunnion having a load carrying bearing for the spring in the form a large flat area which flatly and slidingly contacts the spring regardless of the angular relation of the spring and the mount; and in its provision of a large area of load carrying bearing for the trunnion in its mounting in such physical relation to the spring bearing that all parts are put in simple compression rather than put under shearing or bending stresses. Another important advantage is in simplicity of structure and of assembly and disassembly. Other advantages and accomplishments of the invention will best be gathered from the following detailed description of the present preferred specific and ilustrative embodiment of the invention.

The mounting of the invention is useful however the spring is mounted relative to the vehicle frame; whether directly on it, whether or not one of its ends is fixed longitudinally, or whether an end is carried by a balance beam. The mounting, in fact, may thus be carried by any part of the vehicle structure, including the balance beam. The specific showing, in the accompanying drawings, of the improved mounting in an association with a balance beam where the excellencies of the mounting are most markedly useful, is thus not to be taken as a limitation on the invention.

Figure 1:
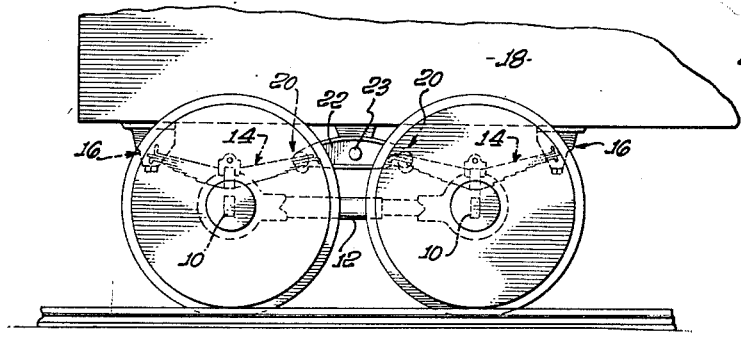
Fig. 1 is a schematic elevation showing a dual axle spring system in which the present invention is here shown as being used.
Figure 2:
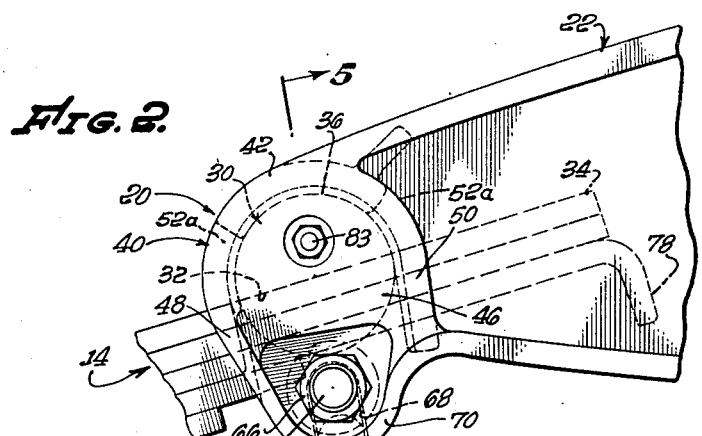
Fig. 2 is an enlarged fragmentary elevation showing the present invention carried by one end of a balance beam.
Figure 3:
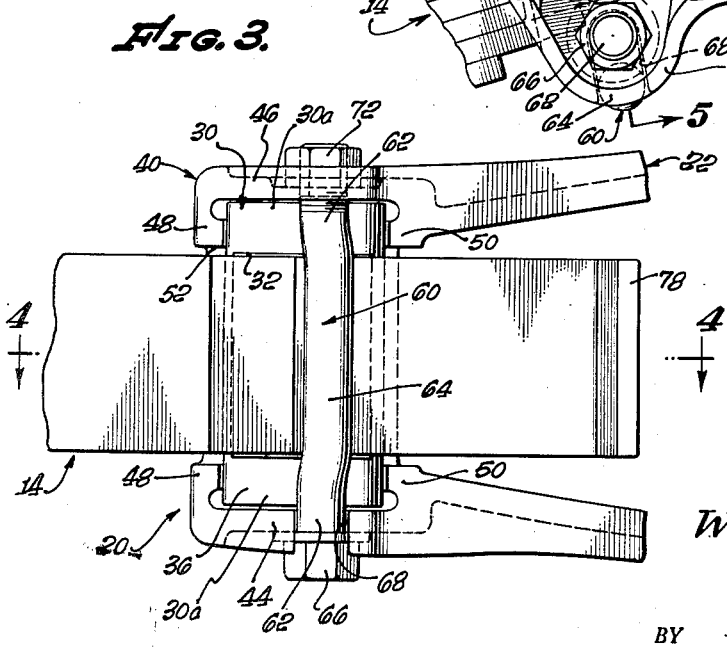
Fig. 3 is an under plan of the parts shown in Fig. 2.

In Fig. 1 the illustrated dual axle system embodies two axles 10 interconnected by a torque rod 12 as set out in Patent No. 2,065,924. Each axle carries semi-elliptic springs 14 whose outer ends at 16 are shackled to the vehicle frame 18 in a manner to restrain longitudinal movements of those ends but to allow their angular movements. Preferred structure of such shackling is shown in the application of Walter Bennett, Ser. No. 305,052, filed August 18, 1952, and is not any part of the invention here. The inner ends of the springs are mounted, at 20, on the opposite ends of balance beam 22 centrally pivoted at 23 on the vehicle frame; and it is those mountings at 20, regardless of whether they are carried by a balance beam, that form the subject matter of the present invention. Insofar as the present invention is concerned the balance beam may be simply regarded as a part of the vehicle structure, although as will appear, the invention is particularly useful in its functioning on a balance beam because it fully accommodates the relatively large angular movements between beam and spring.

Figure 4:
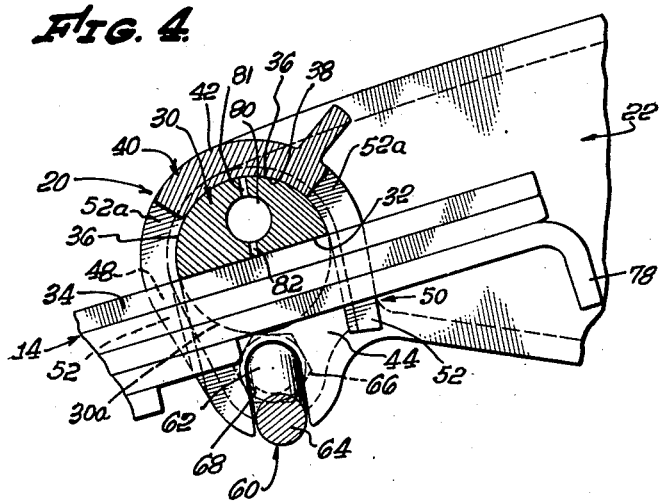
Fig. 4 is a section on line 4—4 of Fig. 3.
Figure 5:
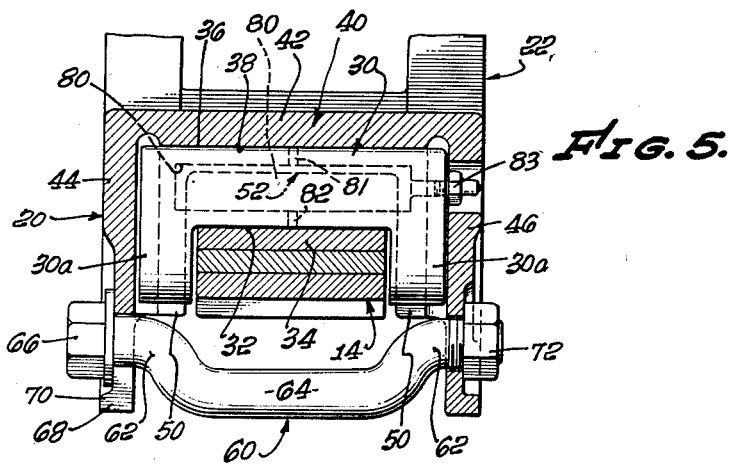
Fig. 5 is a section on line 5—5 of Fig. 2.

Referring now to Figs. 2 to 5, the mounting, designated generally by the numeral 20, is shown as carried by the balance beam 22. The mounting itself consists essentially of a cylindric bearing trunnion 30 provided with a downwardly facing large flat or flattish bearing face 32 against which the uppermost spring leaf 34 bears flatly; and the upper cylindric face 36 of the bearing trunnion, throughout substantially its whole length, bear upwardly against the semi-cylindric upper wall surface 38 of a semi-cylindric housing 40. The housing 40 is in the general form of a box with its lower side completely open, with the upper semi-cylindric wall 42, end walls 44 and 46 and partial side walls 48 and 50 which extend tangentially down from the cylindric upper wall near each end. The side wall structure may otherwise be described as comprising the opposite parallel side walls 48 and 50, notched upwardly from their lower edges with notches 52 whose extent is shown in Fig. 4 and in broken lines in Fig. 5. As may be seen clearly from Figs. 4 and 5, the cylindric trunnion 30 is confined endwise by the end walls 44 and 46 and is confined laterally by the semi-cylindric bearing wall 42 and by the side walls 48 and 50. The spring bears upwardly against the large flat trunnion face 32. That face is formed as a face of a notch in the cylindric trunnion between the two full-cylindric end parts 30a which confine the spring laterally, the spring being held out of edge contact with the housing (Fig. 5).

The spring, as best seen in Fig. 4, extends through the lower part of the box through the notches 52 in the partial side walls 48 and 50. Those wall notches 52, as best seen in Fig. 4, extend up into the cylindric upper wall 42, as at 52a, so as to provide ample clearance for the spring in large relative angular movements between the spring and the bearing box.

The lower bearing face 32 of the trunnion and the upper bearing face of the spring end need not be flat in the sense of being plane surfaces. They may each be, for instance, curved on a fairly large radius; but in any case they engage flatly with each other in the sense that they contact over a large area of the face 32.

The trunnion may preferably be composed of a substance softer than that of the spring and that of the box structure, so that the easily replaceable trunnion will take substantially all or most of the wear.

A bolt 60 extends between the end walls 44 and 46 under the trunnion and spring to prevent accidental dropping of the spring and trunnion out of the bearing box. Preferably this bolt is bent to a shallow U-shape so that it has end portions 62 that lie closely under the terminal cylindric parts 30a of the trunnion to closely confine it. At the same time, its central portion 64 lies in a spaced relation under the spring to provide ample clearance for the spring in its various relative angular positions. The angular position of the spring end relative to the bearing box may change as much as 30° or so, in either direction of rotation, from the relative position shown in Fig. 4.

The bolt 60 preferably has a fixed head 66 on one end. One end of the bolt preferably passes through a notch 68 in the lower edge of box wall 44 and is prevented from dropping down by a rib formation 70. The other end of the bolt passes through a hole in box wall 46 and is provided with a nut 72. A down-turned end 78 on one of the spring leaves may, by engaging bolt 60, prevent any accidental longitudinal disengagement of the spring from the trunnion.

The structural and functional advantages of the mount are readily apparent from consideration of the foregoing. The trunnion presents a broad and large sliding bearing area to the upper face of the spring; and directly above that bearing area the trunnion has direct cylindric bearing in the upper cylindric wall of the bearing box. The two bearing areas are virtually co-extensive; so that the trunnion is put under no stress but that of direct compression.

The two bearing areas being large, they are easily kept lubricated. The trunnion may be composed of self-lubricating material. Or its upper cylindric face may be lubricated through a simple lubricating hole in upper wall 42; and the upper face of the spring needs only to be lubricated adjacent the trunnion and the relative longitudinal movement will work the lubricant under the trunnion face 32. Or, as indicated in Figs. 4 and 5, the trunnion may have an interior lubricant reservoir 80 with openings 81 and 82 leading to its upper and lower bearing faces, respectively, the reservoir being filled through usual fitting 83.

The parts are easily assembled and disassembled. In assembling, the trunnion is simply slipped up into place in the bearing box and then, together with the box, lowered onto the spring; bolt 60 then being put in place. Disassembly for purpose of repair or replacement of parts is equally simple, as is obvious.

I claim:

1. In combination with the end of a semi-elliptic leaf spring, a mounting comprising a box-like structure having an upper semi-cylindric bearing wall, end walls at the ends of the upper wall, and side walls extending down in tangential relation to the semi-cylindric upper wall, the lower side of the box structure being open and the side walls being notched upwardly from their lower edges, a cylindric bearing trunnion in the box structure and confined, as to end play, by said end walls, said trunnion having a cylindric upper bearing face bearing upwardly against the upper semi-cylindric bearing wall and having a lower bearing face against which the spring-end bears directly and flatly upwardly in sliding engagement, the spring extending through the box in the side wall notches.

2. The combination defined in claim 1 and including also a retaining member supported by and extending between the lower parts of the end walls under the trunnion and the spring and normally out of engagement with the spring.

3. The combination defined in claim 1 and in which the trunnion has its lower bearing face formed as the upper face of a notch between two fully cylindric end portions, the said end portions serving to confine the spring laterally.

4. The combination defined in claim 3 and in which the retaining member has end portions lying closely under the cylindric end portions of the trunnion and has a depressed central portion, between said end portions, spaced below the spring.

5. The combination defined in claim 1 and in which the trunnion has its lower bearing face formed as the upper face of a notch between two fully cylindric end portions, the said end portions serving to confine the spring laterally, and a retaining member removably mounted on and extending between the lower portions of the end walls, said retaining member having end portions which lie closely under the end cylindric portions of the trunnion and a central portion spaced below the spring.

6. The combination defined in claim 1, and wherein said side wall notches are centered in said side walls and are extended upwardly into the central portions of the lower edges of the semi-cylindric upper wall, and the spring, when in given conditions of flexure, extends through one or the other of the notch extensions.

7. The combination as in claim 1, wherein said spring is out of edge contact with said end walls.

References Cited in the file of this patent

UNITED STATES PATENTS

| | | |
|---|---|---|
| 1,617,031 | Schacht | Feb. 8, 1927 |
| 1,886,557 | Konetsky | Nov. 8, 1932 |
| 1,967,027 | Hebner | July 17, 1934 |
| 2,469,158 | DeFrees | May 3, 1949 |